US006232882B1

United States Patent
Hed et al.

(10) Patent No.: US 6,232,882 B1
(45) Date of Patent: May 15, 2001

(54) WARNING SYSTEM AND METHOD FOR DETECTION OF TORNADOES

(75) Inventors: Aharon Ze'ev Hed, Nashua, NH (US); Richard Pavelle, Winchester, MA (US); Sol Aisenberg, Natick, MA (US); George Freedman, Wayland, MA (US)

(73) Assignee: Spectrum Electronics, Inc., McLean, VA (US)

( * ) Notice: Subject to any disclaimer, the term of this patent is extended or adjusted under 35 U.S.C. 154(b) by 0 days.

(21) Appl. No.: 09/619,690

(22) Filed: Jul. 19, 2000

(51) Int. Cl.[7] ........................................... G01W 1/00
(52) U.S. Cl. ................... 340/601; 340/600; 73/170.66; 73/384; 702/3
(58) Field of Search ............................ 340/600, 601, 340/690; 73/170.66, 384; 702/3

(56) References Cited

U.S. PATENT DOCUMENTS

| | | | |
|---|---|---|---|
| 3,790,884 | * | 2/1974 | Kohl ................................. 340/601 |
| 3,810,137 | * | 5/1974 | Bacon, Jr. et al. ................. 340/601 |
| 4,812,825 | * | 3/1989 | Kennedy et al. .................. 340/601 |
| 5,148,110 | * | 9/1992 | Helms ............................... 324/323 |
| 6,097,296 | * | 8/2000 | Garza et al. ....................... 340/601 |

\* cited by examiner

*Primary Examiner*—Daniel J. Wu
(74) *Attorney, Agent, or Firm*—Ronald E. Greigg; Edwin E. Greigg

(57) ABSTRACT

To differentiate between lightning strikes and tornado generated electromagnetic signals, a tornado detection system and method is made up of RF receiving circuits which receive signals at two frequencies, while implementing a time variable automated calibration and the use of special algorithms, to reliably detect tornado events and to signal an alarm. A network of such systems can be implemented, using a plurality of antennas which are capable of discerning a directional vector, and integrating the directional information from multiple units by effecting a triangulation calculation in a server terminal to determining a position and path of an approaching tornado.

30 Claims, 3 Drawing Sheets

WARNING SYSTEM AND METHOD FOR DETECTION OF TORNADOES

BACKGROUND OF THE INVENTION

1. Field of the Invention

The present invention relates to methods and systems for detecting tornadoes by means of their electromagnetic signatures, and more particularly, to such methods and systems which are capable of distinguishing between electromagnetic signals caused by tornadoes per se and other electromagnetic signals which are either manmade or associated with common lightning.

2. Description of the Related Prior Art

Tornado detection systems which operate based on the identification of drastic changes in ambient atmospheric pressure, and more particularly rapid reductions in atmospheric pressure, have been previously proposed. One such system is disclosed, for example, by U.S. Pat. No. 3,029,422 to Wilson. Such systems have been found to have certain shortcomings, including a preponderance of false alarms, since low atmospheric pressures, and even the sudden onset of such low atmospheric pressures, can be associated not only with tornadoes, but also with other storm systems of varying severity. As a result, merely detecting the presence or onset of low atmospheric pressures is not a reliable indicator of tornadoes.

On the other hand, a system disclosed in U.S. Pat. No. 3,646,540 to Cooper makes use of the well known phenomenon that approaching tornadoes can cause the appearance of "static" on the screen of a TV monitor, particularly when the monitor is tuned to a lower part (typically channel 2 or about 55 MHz) of the broadcast frequency range. Moreover, such a system is used in conjunction with an aneroid switch which closes when ambient atmospheric pressure falls below a predetermined limit. However, this system also has disadvantages, including the need to employ a miniature TV screen, a light detector and an aneroid switch, making the system expensive and bulky. Furthermore, this system also suffers from an unacceptable rate of false alarms when used in areas where manmade electromagnetic signals from TV stations are prevalent. Although such problems can be alleviated to some extent by fine tuning and frequent calibration of the system to account for the presence of manmade signals which can occur within the same spectral range as that used for detecting tornadoes, as a practical matter, such calibration has to be carried out at each site for which the warning device is intended, and cannot be done during production of the system at the factory.

Bacon et al. in U.S. Pat. No. 3,810,137 propose an alarm system employing a receiver which is tuned to a single frequency in a range of between 20 MHz to 60 MHz, and preferably to 53.25 MHz. The system is additionally coupled to an audio frequency detector for detecting and amplifying the amplitude modulations of a carrier signal in the range of 5 to 2000 Hz which are hopefully caused only by the presence of an oncoming tornado. However, manmade signals within the disclosed frequency range (i.e. TV channel 2 or 55 MHz) can also include amplitude modulations, making calibration of the system for given areas difficult. Essentially, a threshold for the system must be set at which the system will activate an alarm, however, such a calibration can be carried out accurately only for certain limited locations where manmade signals are present only intermittently and not at a constant intensity. Furthermore, in order to be useful, such calibration and threshold settings must be carried out in the presence of an approaching tornado, so as not to result in false alarms (when the threshold is set too low) or result in missing actual threatening tornadoes (when the threshold is set too high). Furthermore, such calibration must take into account the local nature of manmade RF signals, and thus this system cannot be used as a mobile alarm system. The system also suffers from false alarms generated due to normal lightning associated with approaching storms which may not necessarily generate tornadoes, but which can nevertheless activate the alarm too frequently.

Finally, Kennedy et al. in U.S. Pat. No. 4,812,825 describe a tornado alarm system in which an RF receiver is designed to receive an amplitude modulated signal within a broad range of 1 MHz to 100 MHz. Such a receiver is used in conjunction with a wide band amplifier and an integrator which activates a tornado alarm if and only if the amplitude modulation, generated by an approaching tornado, exceeds a minimum threshold for a minimum period not shorter than 3 seconds and, in most instances, between 10 to 25 seconds. The long term integration is designed to differentiate between the continuous electromagnetic noise generated by a tornado and intermittent electromagnetic noises generated by less severe storms, particularly lightning events. However, such long integration periods severely cut the time available for seeking shelter. Furthermore, this system, as with the system described in U.S. Pat. No. 3,810,137, requires the setting of threshold levels, through an automatic gain control, to prevent activation by manmade signals, and these thresholds are necessarily location dependent as well.

To the extent that U.S. Pat. Nos. 3,646,540, 3,810,137 and 4,812,825 demonstrate the well known fact that tornadoes generate electromagnetic noise, and describe means for detecting such noise within certain regions of the electromagnetic spectrum, the disclosures of these patents are hereby expressly incorporated into the present disclosure by reference.

SUMMARY OF THE INVENTION

It is therefore a principal object of the present invention to provide a method and system for the detection of tornadoes which overcomes the deficiencies of the aforementioned prior art.

Yet another object of the present invention is to provide a tornado detection system and method which utilizes algorithms for differentiating between manmade EM signals and naturally occurring EM signals associated with tornadoes.

A further object of the present invention is to provide a tornado detection system and method which is capable of distinguishing between lightning and electromagnetic signals generated by tornadoes.

A still further object of the present invention is to provide a tornado detection system which can be maintained calibrated even in a mobile environment.

A still further object of the present invention is to provide a tornado detection system and method utilizing a network of detectors and associated warning systems for population centers.

To achieve the above objects, the present invention is based on the well known fact that tornadoes generate electromagnetic noise, particularly around the TV broadcasting channel 2 (i.e. about 54 to 60 MHz). However, the present invention also takes into account that it is difficult to electronically distinguish between the noise actually generated by tornadoes and manmade electromagnetic signals occurring within the same frequency range. It is also difficult to avoid triggering false tornado alarms which can occur in the prior art systems as a result of electrical storms which are not necessarily associated with tornadoes.

To overcome such difficulties, the system and method of the present invention provides for a time and site variable calibration of the threshold values of the electromagnetic noise to be detected. Furthermore, according to one embodiment, such noise is detected at two independent frequencies, at least one of which does not typically bear an AM signal in the manmade part of the spectrum. More specifically, at least one of the frequencies is in the range of 54 to 60 MHz, where white noise generated by tornadoes is known to be prevalent, whereas the second frequency is selected to be either within the same range but where broadcasting only of FM signals is practiced, specifically at 59.75 MHz where the audio signal is carried solely on an FM carrier, or in the range of 30 to 50 MHz, which is the frequency band assigned by the FCC to tactical FM only communications.

Surprisingly, the inventors have discovered that in order to differentiate between lightning strikes and tornado generated electromagnetic signals, integration periods of under a second can be used. A lightning strike typically comprises multiple strokes 20 to 50 milliseconds apart, each stroke lasting about 0.1 millisecond. Furthermore, even during intense thunderstorms, lighting strikes usually occur no more frequently than once every few seconds. Based on these facts, the inventors have found that, by receiving signals at two frequencies, while implementing a time variable automated calibration and the use of special algorithms, a tornado detection and alarm system can be provided which is immune to the problems plaguing the prior art.

The above and other objects, features and advantages of the present invention will become apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
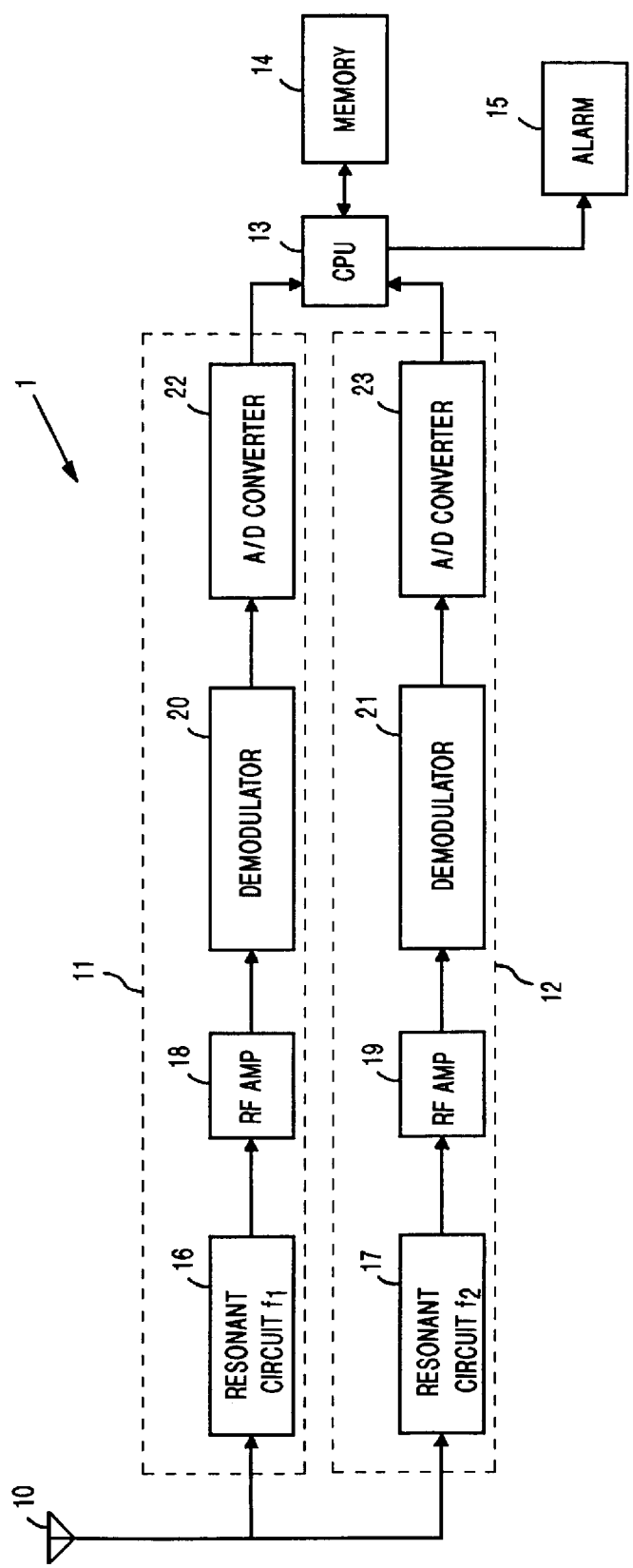
FIG. 1 is a diagram of a system for detecting tornadoes implementing the principles of the present invention according to a first embodiment thereof.

FIG. 1 shows a diagram of a system according to a first embodiment of the present invention. The system includes an antenna 10 and two respective parallel RF receiving circuits 11 and 12. Signals which are received by the two RF circuits are processed and transferred to an electronic central processing system (CPU) 13. As shall be discussed later in greater detail, threshold values, as well as moving averages of the RF signal intensities which are received by the RF receiving circuits 11 and 12, are stored and updated in a memory 14.

Antenna 10 is capable of receiving radio signals in a frequency range of 30 MHz to 60 MHz and can be either a post antenna or a fractal antenna. In addition, it is possible to use a directional loop antenna, which is particularly useful in mobile systems or when a plurality of systems are used in a triangulation mode to determine the path and direction of an incoming tornado.

Each of the RF receivers includes a parallel resonant circuit, designated by 16 and 17 respectively, wherein the receivers are tuned to respective different frequencies $f_1$ and $f_2$. Such frequencies $f_1$ and $f_2$ are both within the range of 30 MHz to 60 MHz, but in particular, one useful pair of frequencies is 55.25 MHz (i.e. the AM video image carrier) and 59.75 MHz (i.e. the FM audio carrier). Another pair shown to be useful is 55.25 MHz and any other secondary frequency within a range of between 30 MHz and 50 MHz, as shall be discussed in greater detail below. Such frequencies may be either fixed at the factory when the system is manufactured, or the frequencies may be tuned during an installation of the system at a particular location through the use of an appropriate data entry system (not shown).

Each of receivers 11 and 12 also includes an RF amplifier, designated by 18 and 19 respectively, for outputting at a given amplification the selected frequency signals from each of the resonant circuits 16 and 17. Amplifiers 18 and 19 preferably include non-linear components, whereby using techniques known in the art, amplifiers 18 and 19 are preferably configured such that as the signal intensity increases, the degree of amplification thereof is made less in accordance with a non-linear function, to prevent saturation of the amplifiers even in the presence of very strong AM signals. Signals from amplifiers 18 and 19 are then directed to respective demodulators, designated by 20 and 21, and the AM amplitudes which are detected are converted to digital signals using respective analog-to-digital (A/D) converters 22 and 23. The digital signals are then transmitted to the CPU 13 for processing in accordance with an algorithm, to be described in detail below. The CPU 13 further communicates with a memory 14, and moreover, is capable of outputting a signal for activating a relay of an alarm 15. In place of or in addition to such an alarm, a display means (not shown) may be provided which visually indicates the presence of an oncoming tornado.

In operation, CPU 13 processes the digital signals received from A/D converters 22 and 23 through an algorithm. Exemplary algorithms, which are implemented by CPU 13, shall now be described in greater detail with reference to FIG. 2.

Figure 2:
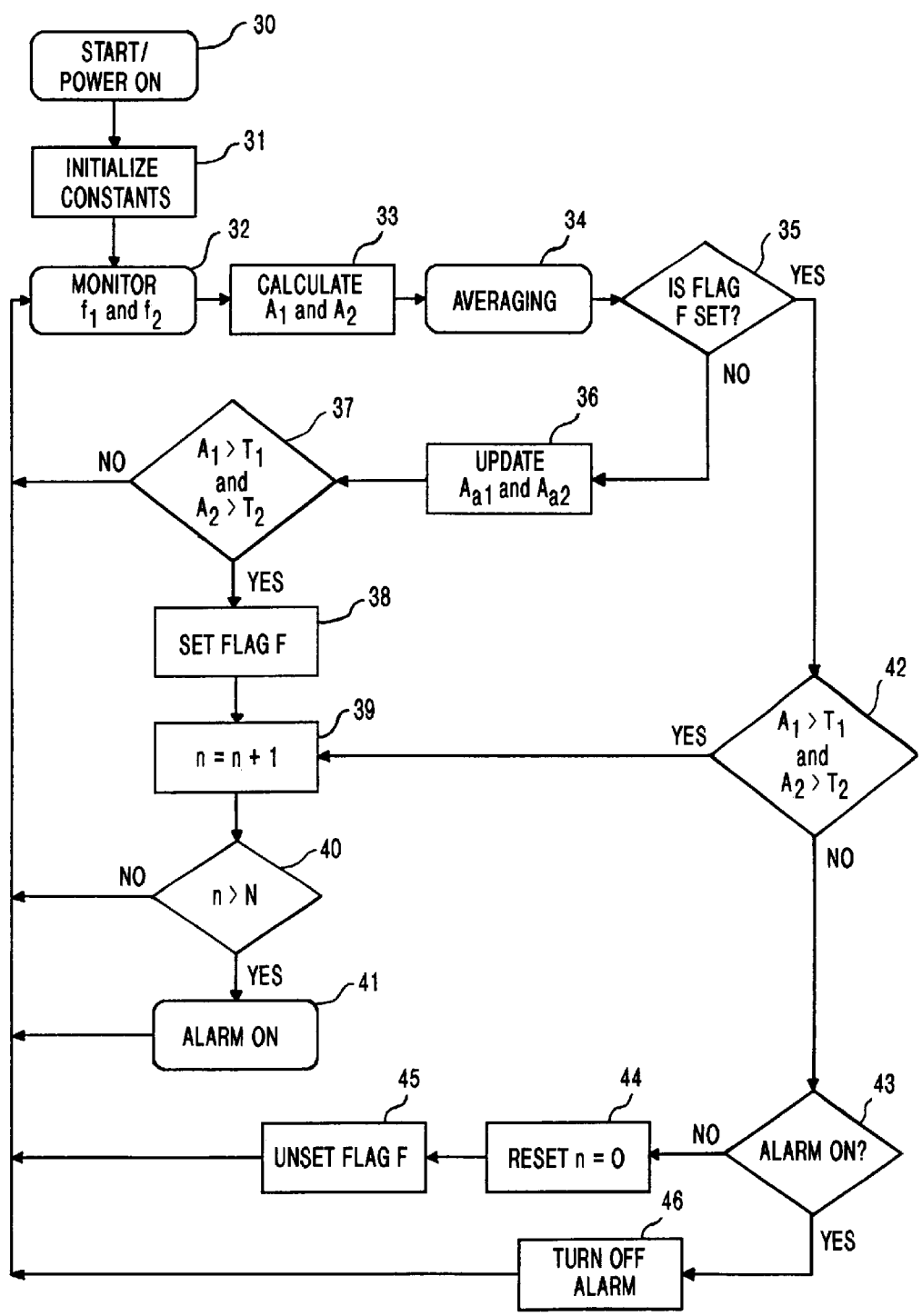
FIG. 2 is a flowchart describing an algorithm for detecting tornadoes which is used in the system shown in FIG. 1.

FIG. 2 is a flowchart describing an algorithm for detecting tornadoes which is used in the system shown in FIG. 1. At Step 30 the system is powered on or initiated, and at Step 31 various constants necessary for operation of the system are initialized. More specifically, these constants can be either default constants residing in memory 14, or alternatively, the constants can be set into the system with an appropriate input device (not shown), depending on the type of system used. The constants typically correspond to a sampling interval t, the selected frequencies $f_1$ and $f_2$, threshold values $T_1$ and $T_2$ for AM amplitudes $A_1$ and $A_2$ corresponding to each of the selected frequencies $f_1$ and $f_2$, and scaling constants $k_1$ and $k_2$ which determine a variable threshold for system activation at the two frequencies $f_1$ and $f_2$ as shall be explained in further detail below. A further constant N defines a predetermined number of sampling intervals at which received AM amplitudes at both frequencies $f_1$ and $f_2$ have been determined to exceed the threshold values $T_1$ and $T_2$, respectively, thereby providing a time window large enough to ensure that any detected noise is indeed due to a tornado, and not merely a lightning event or other spurious EM disturbance.

Sampling interval t is selected to be longer than the time it takes for a single stroke within a lightning strike to occur, which is of the order of 0.1 ms, but shorter than the time typically between strokes in a given lightning event, which is ordinarily between 20 and 50 ms. Thus, a preferable selection for t provides a 1 ms sampling interval, and further to allow ample time for processing, each of the two samples from each frequency $f_1$ and $f_2$ are separated by a standby interval of, for example, 1 ms as well. It is of course possible to continuously sample and monitor the two frequencies (i.e. wherein the standby interval is zero), however, continuous sampling is generally considered to be unnecessary when detecting tornadoes, since AM white noise generated by a tornado is continuous over a period of time far in excess of 10 seconds.

During the initialization Step 31, default values $T_1(d)$ and $T_2(d)$ for the thresholds $T_1$ and $T_2$ are also set. Such thresholds are used in Step 37 and Step 42 to determine if the monitored AM amplitudes at frequencies $f_1$ and $f_2$ have each reached a value high enough, and for a time period that is long enough, to trigger the alarm. The actual values of $T_1$ and $T_2$ which are used during execution of the algorithm, are the greater of the default values $T_1(d)$ and $T_2(d)$ and values obtained by multiplying moving averages of $A_1$ and $A_2$ by appropriate scaling constants $k_1$ and $k_2$. Thus, at Step 37 and Step 42, $T_1$ and $T_2$ are determined respectively in accordance with the following formulae:

$$T_1 = \max\{k_1 A_{a1}, T_1(d)\} \tag{1}$$

$$T_2 = \max\{k_2 A_{a2}, T_2(d)\} \tag{2}$$

where $A_{a1}$ indicates a moving average of amplitude value $A_1$ and $A_{a2}$ indicates a moving average of amplitude value $A_2$. The calculation of such moving averages will be explained in greater detail below.

Setting of the threshold values in this manner assures, on the one hand, that default thresholds will exist as minimum thresholds, even in the absence of any manmade RF noise at a given location. On the other hand, the appropriate threshold values change as the average AM amplitudes change over time due to background and/or manmade signals. Typically, the values for scaling constants $k_1$ and $k_2$ are set at around 1.5. More specifically, when the monitored AM amplitudes $A_1$ and $A_2$ exceed 1.5 times the average AM amplitudes as determined in accordance with moving averages $A_{a1}$ and $A_{a2}$, and for a long enough duration as determined by the constant N, the system then activates the tornado alarm 15. It should be clear, however, that the values selected for $k_1$ and $k_2$ may be varied, or can be set by the manufacturer, or be based on the particular location or environmental conditions where the tornado detector is expected to be installed and used.

Also during the initialization Step 31, a minimal time period is set. In order for the alarm to be activated, the AM signals must remain greater than any locally produced manmade AM signals at the two monitored frequencies $f_1$ and $f_2$ for a duration of time exceeding such a minimal time period. The minimal time period is set by selecting a number N, which is the number of sequential sampling intervals during which $A_1 > T_1$ and $A_2 > T_2$, which must occur before the alarm will be activated. Typically, a half a second is appropriate as the minimal time period to avoid spurious effects. For example, assuming the sampling time interval t is set at 1 ms, and sampling is performed every 2 ms (i.e. wherein the sampling window is open for one millisecond and closed during the next millisecond), then N can be set at 250 to result in a minimum time period of half a second (2 ms×250) after which the tornado alarm will be activated.

As discussed above, for most cases, it is acceptable for the monitored frequencies $f_1$ and $f_2$ to be fixed and thus "factory set." However, it is also possible to enable the frequencies $f_1$ and $f_2$ to be selected by a user on site, through the use of a non-illustrated input device, in which case these frequencies are also set during the initialization Step 31.

Finally, during initialization Step 31, parameters associated with generating moving averages of the AM signals are initiated, and moreover, initial or default values for $A_{a1}$ and $A_{a2}$ (which may initially be set to zero) are also set for facilitating smooth operation of the averaging subroutine in Step 34. The parameters for generating the moving averages, as well as operation of the averaging subroutine in Step 34, shall be discussed in greater detail below.

After completion of system initialization, at Step 32 the system is directed to monitor the two selected frequencies $f_1$ and $f_2$. An internal CPU clock controls the monitoring intervals wherein, as mentioned above, the preferred mode of operation is to have a monitoring time interval t during which the frequencies $f_1$ and $f_2$ are sampled, followed by a standby time, typically of the same length t, during which sampling of the frequencies is not performed. Although this is the preferred mode, alternatively, the standby time and the monitoring time intervals can vary from each other. Further, to obtain continuous monitoring, the standby interval can be set (typically by a factory setting) at a minimum finite value very close to nil. During each measurement cycle, the then current AM amplitudes $A_1$ and $A_2$ are calculated by the CPU 13 from the data transmitted thereto by the respective channel demodulators 20 and 21 after being converted into digital form by each of the A/D converters 22 and 23. The program then calls an averaging subroutine which is executed in Step 34.

At Step 34, an averaging subroutine updates the values of the two average amplitudes $A_{a1}$ and $A_{a2}$ which are to be used during subsequent decision Step 37 and decision Step 42, respectively. Persons skilled in the art will appreciate that various different kinds of moving averages for these amplitude values can be conceived of and implemented according to the present invention. For example, one such moving average takes the last value of $A_{ai}$, i.e. $A_{aiOLD}$ (wherein subscript "a" designates $A_{ai}$ as a moving average, and subscript "i" is either 1 or 2 to represent the two frequencies $f_1$ and $f_2$ being monitored), multiplies it by m-1, where m is the number of measurements over which the average is taken, adds to it the most recently calculated value of $A_i$, and then divides that sum by m to result in a updated moving average $A_{aiNEW}$, as shown by the following equation:

$$A_{aiNEW} = \frac{A_{aiOLD}(m-1) + Ai}{m} \tag{3}$$

As an alternative to the above equation, another example of a moving average is one in which simply the sum of the last m values previously recorded for $A_{ai}$, including the last measurement, are divided by m. Similarly, averages that give more weight to specific periods can also be utilized.

Whichever type of moving average is used, it is updated (i.e. $A_{aiNEW}$ is calculated from $A_{aiOLD}$) with each measurement taken (except in the case described below when a counting flag F is already set), and thus, if m is, for instance, 1000, then the averages tend to be more heavily weighted toward the last two seconds of measurements. It is also possible to use an average of previously calculated averages, in order to give less weight to recent measurements. In this case, an hourly, or even daily, average may be calculated and stored, wherein the hourly or daily average is used as the most recent $A_{ai}$, thereby giving more weight to longer prior time intervals. This would be done to prevent $A_{ai}$ from being unduly influenced by changing atmospheric conditions near the time of the actual measurements, as well as daily fluctuations in the intensity of manmade signals.

The type of moving average used is part of the initialization process, with few options being made available to the installer depending on local conditions. As shall be described in more detail below, however, it should be borne in mind that no updating of the moving averages $A_{ai}$ is carried out once an excursion of the value $A_{ai}$ above the threshold values $T_1$ is detected. A typical system would have the moving averages $A_{ai}$ (and thus threshold values $T_i=k_iA_{ai}$) which are averaged over between 30 minutes to an hour of previous data, as the standard against which the current values of $A_1$ are compared in Step 37 and Step 42.

Next, the system proceeds to Step 35 where it queries whether a counting flag F has been set. The counting flag F controls the manner in which a time counter, which is effected in Step 39, shall be implemented within the current sampling interval. More specifically, the flag F is set upon the first detection of a condition in which $A_1$ and $A_2$, the most recent measurements of the AM amplitudes at the two frequencies $f_1$ and $f_2$, have both increased simultaneously above their respective variable threshold values $T_1$ and $T_2$. In this case, simultaneously means within the sampling period t. If the counting flag F is not set, namely, if there were no prior immediate events in which the observed amplitudes at the two selected frequencies have increased above their prevailing threshold values, the system then proceeds to Step 36 where each of the moving averages are once more updated.

Next, in Step 37, the most recently measured amplitudes $A_1$ and $A_2$ are compared with the then prevailing threshold values $T_1$ and $T_2$. As shown above in equations (1) and (2), threshold values $T_1$ and $T_2$ are the maximum of a set, for each of the monitored frequencies $f_1$ and $f_2$, which includes a default threshold $T_i(d)$ and the product of a scaling constant $k_i$ (the index i, being either 1 or 2) and the moving average of the observed AM amplitude $A_{ai}$. If both amplitudes $A_i$ are larger than their respective thresholds $T_1$, then the counter flag F is set in Step 38. On the other hand, if only one or both amplitudes $A_i$ are smaller than their respective thresholds $T_i$, the decision at Step 37 is NO and the program is directed back to monitor the two frequencies $f_1$ and $f_2$, thereby initiating another sampling cycle in Step 32 without setting the counter flag F. In this fashion, so long as no tornadoes have been detected, the average values of the background noise at the two selected frequencies is constantly updated.

In the event that a tornado is potentially approaching, the AM amplitudes $A_1$ and $A_2$ will both simultaneously increase above the background noise and hence the comparison performed at Step 37 will indicate that amplitudes $A_1$ and $A_2$ both exceed their prevailing thresholds $T_1$ and $T_2$, and the decision at Step 37 will be YES, thereby setting the counting flag F in Step 38, to indicate that counting is to commence with Step 39. That is, when it is detected, in Step 37, that the amplitude signals are both above their then set thresholds, and further since Step 37 is the part of the algorithm in which the signals are detected to be above their prevailing thresholds for the first time after a quiescent period (because the program proceeds to Step 37 only if the counter flag F was not set in Step 35), the counter flag F is set in Step 38, while the value of n is incremented (n=n+1) in Step 39. On the other hand, if the prior amplitude signals $A_1$ and $A_2$ were greater than their respective thresholds and hence the counter flag F was set during the previous sampling interval, the decision will be YES at Step 35, and Step 39 is reached via the comparison and decision Step 42, while n is still incremented from its current value to n+1.

After the value of n is incremented, the system proceeds to Step 40 where a check of n is made to see if it is greater than a preset number N. Since typically each cycle is about 2 ms, if the alarm is to be activated after a half a second of persistent AM noise above the respective thresholds, $T_1$ and $T_2$ at both frequencies, $f_1$ and $f_2$, then N will be set at 250. As long as n is less than N, the program sill directs the system to continue to monitor the two frequencies by returning to Step 32. However, if a tornado is approaching, thresholds $T_1$ and $T_2$ are exceeded for a time period long enough to allow the system to cycle through incrementing Step 39 multiple times until n is greater than the constant N, and then the system will be directed to activate an alarm at Step 41. After activation of the alarm at Step 41, the system continues to monitor the two frequencies by returning to Step 32. In this fashion, false alarms due to lightning or as a result of the threshold values being set too low are avoided, however, an alarm will be reliably activated only after half a second of continuous "broadcasting" of its presence by a nascent approaching tornado.

If, at Step 35, the program determines that the counter flag F has already been set (i.e. thresholds $T_1$ and $T_2$ have been exceeded once and hence the program has passed through Step 38), the program automatically goes to Step 42, which is functionally equivalent to Step 37, but without updating of the averages $A_{ai}$. If at this point the signals are still larger than the then prevailing thresholds, the program proceeds again to Step 40 to increment n by 1 (the flag F is of course already set in this branch of the algorithm), and once again the program checks if the condition of high AM signals at both frequencies is persistent for a period longer than that represented by N. As before, the alarm will be activated only if n is greater than N, and if not, the program will return to monitoring frequencies $f_1$ and $f_2$ at Step 32.

On the other hand, if the system detects that that the AM amplitudes have decreased below the then prevailing threshold values $T_1$ and $T_2$, then a NO decision results at Step 42 and the program advances to Step 43 where it checks whether the alarm 15 is currently activated, which can be accomplished by checking whether n is still greater than N. If, at Step 43, it is determined that the alarm is ON (i.e. n exceeded N in the prior cycle), namely, the AM amplitudes $A_1$ and $A_2$ at the monitored frequencies have exceeded the then prevailing threshold values $T_1$ and $T_2$ for at least N cycles, then the system is directed to deactivate the alarm, at Step 47, and then return again to Step 32 to monitor the two frequencies.

After the alarm has been deactivated in Step 47 as described above, the program cycles again through Step 32, Step 33, Step 34 and (since flag F is still set) through Step 35. At this point, if the AM amplitudes $A_1$ and $A_2$ are still less than thresholds $T_1$ and $T_2$, this results in a NO decision at Step 42 and the program proceeds to Step 43. Now, at Step 43, since the alarm is already deactivated, the program advances to Step 45 where n is reset to zero and to Step 46 where flag F is unset. Such actions allow the program to begin a new tornado detection cycle where, since F has been restored to its original unset state, passage through Step 36 and Step 37 is once again enabled. Moreover, setting of flag F and incrementing of n only occurs if a new potential tornado event is detected at Step 37.

It should be noted that the algorithm assures that the increased values of $A_i$ associated with an approaching tornado are not allowed to be included in the averages $A_{ai}$ which are used for forming the thresholds $T_1$ and $T_2$, since the CPU 13 controls the program, in Step 35, to bypass updating Step 36 and to proceed directly to Step 42 where the test of amplitudes against the thresholds is conducted. Thus, at most, only one pair of high values $A_i$, which are associated with the first excursion above the thresholds, is included within the averages after a potential tornado event is first detected in Step 37. Those skilled in the art will readily recognize that an additional subroutine could easily be added to the program to subtract the last values of $A_i$ from the running averages $A_{ai}$ once flag F has been set for the first time, although typically this is an unnecessary precaution, since the averages are calculated over a large number m, as shown by Equation (3) above, which represents on the order of 1000 prior samples.

It will also be appreciated that the algorithm prevents activation of the alarm for a singular event, or short strings of events, such as lighting, during which decision Step 37 or Step 42 will return a YES response, but wherein the number of cycles of the program through Step 39 will not be sufficient for n to be incremented in excess of N and thereby trigger the alarm.

Persons skilled in the art will also understand that certain variations to this algorithm can be envisaged and implemented without deviating from the spirit of the present invention. For instance, at Step 43, prior to proceeding to Step 44, Step 45 or Step 46 respectively, the program could be configured to require a few additional cycles of $A_1$ and $A_2$ at readings below their respective thresholds $T_1$ and $T_2$ before the system is directed either to reset the counter and flag F or disengage the alarm. More specifically, if in association with Step 43 the program required 10 such repeating cycles, this will add at most 20 milliseconds of time during which the system either believes that an impending tornado event is still occurring or that a passed tornado event has occurred. Such an additional logic loop will assure robustness of the system.

As yet another alternative, persons skilled in the art will recognize that other algorithms which are capable of differentiating between lighting-generated signals and tornado-generated RF signals can be implemented in combination with the algorithms described above. An example of such an algorithm is one which uses very low frequency AM modulated RF signals, in the range of from 50 to 150 KHz (i.e. the band used for AM radio broadcasting). Natural signals which are generated within this low frequency band are typically caused by lightning only, and not tornadoes, and thus such signals can be used to discriminate against lightning events. Thus, even if the algorithm in FIG. 2, or other equivalent algorithms, were to suggest a tornado event, yet according to such a further algorithm signals within the low frequency range of 50 to 150 KHz were simultaneously detected, suggesting the absence of a tornado and lightning only, then the further algorithm would act to prevent the triggering of the alarm. In implementing such a secondary algorithm, one must be careful not to negate lengthy periods (more than a second) of high noise on both $f_1$ and $f_2$, as tornado signals. The low frequency detector is best used as confirmation of lightning activities.

The tornado detecting system 1 may be incorporated as part of a conventional smoke detector and housed inside a conventional smoke detector casing. When used in this manner, the combined system is typically provided with two distinctly different alarm subsystems, or if used with the same alarm, the alarm is capable of producing sounds in a temporally or aurally different manner. For instance, a smoke alert would be at one pitch and a tornado alert at a different pitch, or alternatively, a smoke alert could be a continuous tone and a tornado alert an intermittent tone, or vice versa.

Figure 3:
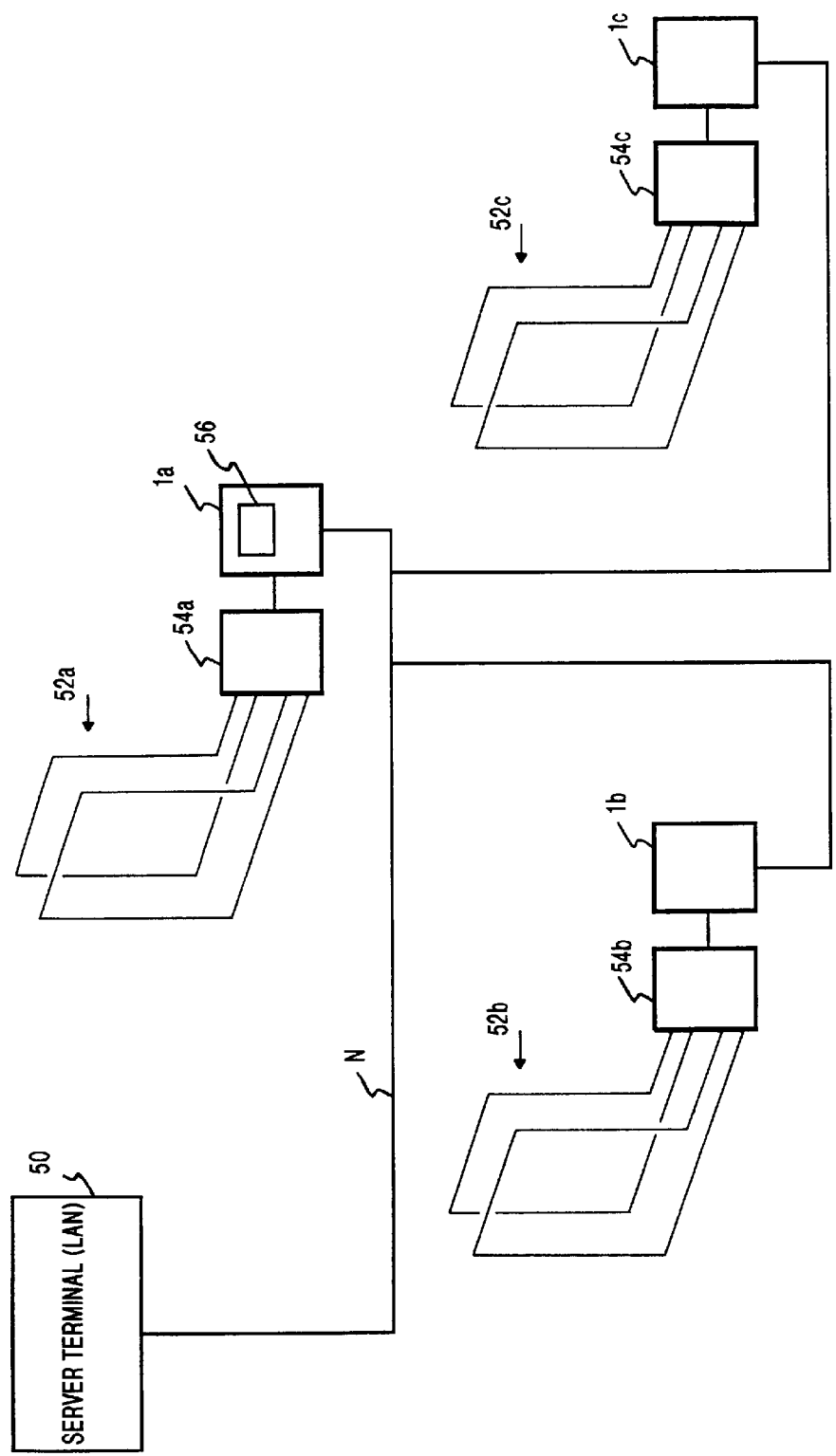
FIG. 3 shows a plurality of tornado detecting systems, with respective antennas arranged for determining the direction and path of a moving tornado.

A further embodiment of the invention is illustrated in FIG. 3, in which a plurality of tornado detecting systems are shown with respective antennas arranged for determining the direction and path of a moving tornado. The individual systems 1a, 1b and 1c are each constituted by the system 1 shown in FIG. 1, or any of the other system variations discussed above, however, wherein each system 1a, 1b and 1c is interconnected to each other through a local area network N, via modem connections or a wireless interface, the local area network further comprising a server terminal 50. Typically at least one of the systems is provided as a mobile system, and furthermore, the threshold values for each of the systems are updated regularly at least once every five seconds. Each system is provided with a directional loop antenna 52a, 52b and 52c and a rotator 54a, 54b, 54c for determining directional vectors $V_a$, $V_b$ and $V_c$ at which the detected signal amplitudes $A_i$ are at a maximum. The directional vectors are then transmitted through the network to the server terminal 50, which determines, using methods known in the art, through the intersection of at least two of such directional vectors, the direction and speed of progression of a nascent or mature tornado. A known global positioning GPS receiver 56 may also be used in conjunction with a program in at least one of the deployed tornado detecting systems 1a, 1b or 1c (for example with system 1a as shown in FIG. 4), to facilitate precise geographic plotting of the tornado trajectory and provide warning to any locally threatened population centers.

Having described herein the preferred embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features which have been shown and described, but shall be construed also to cover any obvious modifications and equivalents thereof.

What is claimed is:

1. A system for detecting tornadoes, comprising:
    a first RF receiving circuit adapted to be connected to an antenna and comprising a resonant circuit tuned to receive an RF signal at a first predetermined frequency;
    a second RF receiving circuit adapted to be connected to an antenna and comprising a resonant circuit tuned to receive an RF signal at a second predetermined frequency;
    memory means storing a pair of predetermined threshold values and an algorithm to distinguish between an electromagnetic signature of a tornado, intermittent electromagnetic signals and manmade signals; and
    processing means connected to said first and second RF receiving circuits, for receiving respective amplitude signals indicating amplitudes of the RF signals at said first and second predetermined frequencies, said processing means further comprising means for applying said algorithm to said amplitudes of the RF signals at said first and second frequencies to detect a tornado, said processing means further comprising means to emit a signal when said algorithm detects a tornado.

2. The system according to claim 1, further comprising alarm and/or display means and said emitted signal activates said alarm and/or display.

3. The system according to claim 1, wherein said predetermined threshold values are continuously updated according to the background electromagnetic noise prevailing at the system site at said two frequencies.

4. The system according to claim 1, wherein the algorithm comprises the steps of:
comparing the RF amplitudes received at said two frequencies to their respective threshold values;
updating said threshold value to exceed background noise and manmade signals at said frequencies; and
determining the presence of a tornado if and only if both amplitudes are greater than their respective threshold values for a period greater than a predetermined time interval, said interval being longer than that of natural intermittent signals such as lightening.

5. The system according to claim 1, wherein said first and second frequencies are both within a range of from 30 MHz to 60 MHz.

6. The system according to claim 5, wherein said first frequency is set within a range of a frequency spectrum publicly used for carrying AM video image signals, and said second frequency is set within a range of the frequency spectrum publicly used for carrying FM audio signals.

7. The system according to claim 6, wherein said first frequency is set at 55.25 MHz and said second frequency is set at 59.75 MHz.

8. The system according to claim 4, wherein said processing means further comprises:
means for sampling said respective amplitudes of said first and second frequencies for a predetermined sampling interval; and
means for counting a predetermined number of consecutive sampling intervals during respective measurement cycles at which said RF amplitudes at said first and second frequencies exceed said predetermined threshold values, wherein said predetermined time interval is determined by said predetermined number.

9. The system according to claim 8, wherein said sampling interval is between 0.1 ms and 50 ms.

10. The system according to claim 8, wherein said respective amplitudes are sampled simultaneously.

11. The system according to claim 8, wherein a standby time interval, during which sampling is not performed, occurs between sampling of said respective amplitudes.

12. The system according to claim 4, wherein said threshold values comprise first and second threshold values each comprising the product of an average of previously received amplitude signals times a scaling constant.

13. The system according to claim 12, further comprising default threshold values $T_1(d)$ and $T_2(d)$ associated with each of said first and second threshold values, wherein said first and second threshold values $T_1$ and $T_2$ are calculated according to the following equations:

$$T_1 = \max\{k_1 A_{a1}, T_1(d)\}$$
$$T_2 = \max\{k_2 A_{a2}, T_2(d)\}$$

where $k_1$ and $k_2$ are scaling constants for each of said first and second threshold values, and $A_{a1}$ and $A_{a2}$ are respective averages of previously received amplitudes at said first and second frequencies.

14. The system according to claim 13 wherein said respective averages are updated during each measurement cycle, unless during the preceding measuring cycle said amplitude values for both of said first and second frequencies have exceeded the first and second threshold values, respectively.

15. A method of detecting tornadoes by distinguishing the electromagnetic signature of a tornado from manmade signals and intermittent natural signals comprising the steps of:
setting a first RF receiving circuit, adapted to be connected to an antenna and comprising a resonant circuit, to be tuned at a first predetermined frequency;
setting a second RF receiving circuit, adapted to be connected to an antenna and comprising a resonant circuit, to be tuned at a second predetermined frequency;
storing a pair of predetermined threshold values that are greater than present ambient manmade signals;
receiving with said first and second RF receiving circuits, respective amplitude signals indicating amplitudes of the RF signals at said first and second predetermined frequencies;
comparing said amplitude signals with said predetermined thresholds values; and
emitting a signal indicating detection of a tornado when both of said amplitude signals exceed said predetermined threshold values for a predetermined duration of time.

16. A method according to claim 15, further comprising an alarm means and/or display means, and said signal activates said alarm means and/or display means.

17. A method according to claim 15, wherein said predetermined threshold values are continuously updated according to the background electromagnetic noise prevailing at the system site at said two frequencies.

18. The method according to claim 15, wherein said first and second frequencies are both within a range of from 30 MHz to 60 MHz.

19. The method according to claim 15, further comprising the steps of:
setting said first RF receiving circuit to be tuned to said first frequency within a range of a frequency spectrum used publicly for carrying AM video image signals; and
setting said second RF receiving circuit to be tuned to said second frequency within a range of the frequency spectrum used publicly for carrying FM audio signals.

20. The method according to claim 19, wherein said first frequency is set at 55.25 MHz and said second frequency is set at 59.75 MHz.

21. The method according to claim 15, further comprising the steps of:
sampling said respective amplitudes of said first and second frequencies for a predetermined sampling interval; and
counting a predetermined number of sampling intervals during respective measurement cycles at which both of said first and second frequencies exceed said predetermined threshold values, wherein said predetermined duration of time is determined by said predetermined number.

22. The method according to claim 21, wherein said sampling interval is between 0.1 ms and 50 ms.

23. The method according to claim 21, wherein said respective amplitudes are sampled simultaneously.

24. The method according to claim 21, wherein a standby time interval, during which sampling is not performed, occurs between sampling of said respective amplitudes.

25. The method according to claim 17, further comprising setting said threshold values as first and second threshold values, wherein said first and second threshold values each comprise the product of an average of previously received amplitude signals times a scaling constant.

26. The method according to claim 25, further comprising the steps of:
setting default threshold values $T_1(d)$ and $T_2(d)$ associated with each of said first and second threshold values;

calculating said first and second threshold values $T_1$ and $T_2$ according to the following equations:

$$T_1 = \max\{k_1 A_{a1}, T_1(d)\}$$

$$T_2 = \max\{k_2 A_{a2}, T_2(d)\}$$

where $k_1$ and $k_2$ are scaling constants for each of said first and second threshold values, and $A_{a1}$ and $A_{a2}$ are respective averages of previously received amplitudes at said first and second frequencies.

27. The method according to claim 26, further comprising the step of updating respective averages during each measurement cycle, unless during a prior measuring cycle said amplitude values for both of said first and second frequencies have exceeded the first and second threshold values, respectively.

28. A system for detecting tornadoes, comprising:
   a plurality of tornado detectors, wherein each of said tornado detectors comprises:
      a first RF receiving circuit adapted to be connected to an antenna and comprising a resonant circuit tuned to receive an RF signal at a first predetermined frequency;
      a second RF receiving circuit adapted to be connected to an antenna and comprising a resonant circuit tuned to receive an RF signal at a second predetermined frequency;
      memory means storing a pair of predetermined threshold values and an algorithm to distinguish between an electromagnetic signature of a tornado, intermittent electromagnetic signals and manmade signals; and
      processing means connected to said first and second RF receiving circuits, for receiving respective amplitude signals indicating amplitudes of the RF signals at said first and second predetermined frequencies, said processing means further comprising means for applying said algorithm to said amplitudes of the RF signals at said first and second frequencies to detect a tornado, said processing means further comprising means to emit a signal when said algorithm detects a tornado;
   a digital communications network interconnecting said RF receiving units and a server terminal,
   wherein said tornado detectors each further comprise processing means for determining the direction of maximum signal, when a tornado is detected, and means for emitting a signal indicating a directional vector at which an amplitude of the RF signal is maximum, and
   wherein said directional vectors from each of said tornado detectors are transmitted through said communications network to said server terminal, said server terminal having means for determining an intersection of at least two directional vectors for detecting a position of the detected tornado.

29. The system according to claim 28, wherein said antennas associated with each tornado detector comprise directional loop antennas.

30. The system according to claim 28, wherein at least one of said tornado detectors is mobile and the said threshold values associated with each said tornado detector are updated at least once every 5 seconds.

* * * * *